United States Patent
Kim et al.

(10) Patent No.: US 7,596,646 B2
(45) Date of Patent: Sep. 29, 2009

(54) WIRELESS USB HOST APPARATUS SUPPORTING UWB

(75) Inventors: Jong Won Kim, Daejeon (KR); Jae Doo Huh, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 340 days.

(21) Appl. No.: 11/320,110

(22) Filed: Dec. 28, 2005

(65) Prior Publication Data

US 2007/0073935 A1    Mar. 29, 2007

(30) Foreign Application Priority Data

Sep. 15, 2005    (KR) .................. 10-2005-0086336

(51) Int. Cl.
*G06F 13/12* (2006.01)
(52) U.S. Cl. ................. 710/72; 710/52; 710/62
(58) Field of Classification Search .............. None
See application file for complete search history.

(56) References Cited

U.S. PATENT DOCUMENTS

| | | | | |
|---|---|---|---|---|
| 5,996,028 A * | 11/1999 | Niimi et al. | ............ | 710/13 |
| 6,266,715 B1 * | 7/2001 | Loyer et al. | ............ | 710/22 |
| 6,370,603 B1 * | 4/2002 | Silverman et al. | ............ | 710/72 |
| 6,788,730 B1 * | 9/2004 | Richards et al. | ............ | 375/138 |
| 2003/0081630 A1 * | 5/2003 | Mowery et al. | ............ | 370/466 |
| 2005/0237965 A1 * | 10/2005 | Kuperschmidt et al. | ..... | 370/321 |
| 2006/0159158 A1 * | 7/2006 | Moore et al. | ............ | 375/130 |

FOREIGN PATENT DOCUMENTS

| KR | 20010005140 | | 1/2001 |
|---|---|---|---|
| KR | 1020010005140 A | * | 2/2001 |
| KR | 20030035596 | | 5/2003 |

OTHER PUBLICATIONS

John Stewart, CardBus, Dec. 10, 2002, www.SearchCIO-Midmarket.com, http://searchcio-midmarket.techtarget.com/sDefinition/0,,sid183_gci213783,00.html#.*
Tom Krazit, "PCMCIA group releases new ExpressCard standard", Sep. 15, 2003, www.infoworld.com, http://www.infoworld.com/article/03/09/15/HNpcmcia_1.html.*
Wireless LAN using U.S.B. Interface Bus, Application No. 10-1999-0025938, machine translation.*
Universal Serial Bus Specification Revision 2.0, Apr. 27, 2000, pp. 13, 67, 197, and 250.*

* cited by examiner

*Primary Examiner*—Eron J Sorrell
(74) *Attorney, Agent, or Firm*—Ladas & Parry LLP

(57) ABSTRACT

A wireless USB host apparatus supporting UWB is disclosed. The wireless USB host apparatus allocates a Media Access Slot of USB super frame to each of a plurality of wireless USB devices to transmit the real-time audio/video data as well as command data, control data and non real-time data through a single transmission channel. Also, the wireless USB host apparatus uses the ultra wide band to exchange data with the plurality of wireless USB devices to support the data transfer rate of about 53.3 to 480 Mbps, guarantees the QoS and supports transmission of the real-time audio/video data.

11 Claims, 8 Drawing Sheets

WIRELESS USB HOST APPARATUS SUPPORTING UWB

RELATED APPLICATION

The present application is based on, and claims priority from, Korean Application Number 2005-86336, filed Sep. 15, 2005, the disclosure of which is hereby incorporated by reference herein in its entirety.

BACKGROUND OF THE INVENTION

1. Field of the Invention

The present invention relates to a wireless universal serial bus (USB) host apparatus supporting ultra wide band (UWB) for transforming data stored in a notebook PC to an ultra wide band (UWB) signal, building and controlling a network to connect a plurality of wireless USB devices.

2. Description of the Related Art

A conventional external data bus such as a serial port or a parallel port generally provides low data transfer rate and allows limited connections to peripheral devices. In order to overcome such shortcomings of the conventional external data bus, a universal serial bus (USB) was introduced. The USB is one type of serial ports and supports a high-speed data transfer rate, for example 12 Mbps. Also, the USB can be used to connect a plurality of peripheral devices. Accordingly, the USB has been commonly used as a plug and play interface for providing the connections between a host such as a computer and various peripheral devices such as an audio player, a joystick, a keyboard, a telephone, a scanner and a printer. Differently from the conventional external data bus, a single USB port can be used to connect to a plurality of peripheral devices such as a keyboard, a monitor, a mouse, a printer and a MODEM. Maximum 127 peripheral devices can be connected to the host through a single USB port. Due to such advantageous features of the USB port, most of the computers and the peripheral devices support the USB.

A conventional USB interface supports a wired data transmission. However, a wireless communication technology has been dramatically developed, and also, various peripheral devices supporting wireless communication and connectable to a host have been introduced and popularly used among users. In order to provide a wireless link between a host and peripheral devices, a wireless technology for a USB interface has been proposed.

A conventional wireless technology for a USB interface was introduced in Korea Publication No. 2001-0005140, entitled "wireless LAN module using USB interface bus".

The conventional wireless LAN module includes a connecting unit employing a USB interface. The conventional wireless LAN module converts data to a wireless signal for a wireless local area network employing IEEE 802.11 and transmits the wireless signal through the USB interface of the connecting unit. Therefore, the conventional wireless LAN module provides the improved compatibility.

However, the conventional wireless LAN module builds a local area network based on IEEE 802.11, and includes a USB chip to connect to a host, i.e., a computer. Accordingly, the conventional wireless LAN module is very difficult to install and has a complicated structure. Furthermore, the wireless communication standard of IEEE 802.11 provides maximum wireless data transfer rate of 54 Mbps and does not guarantee a quality of service (QoS). Therefore, the conventional wireless LAN module cannot be used to transmit real-time audio/video data.

As described above, the conventional technology is not suitable to high-speed wireless data transmission between a computer and peripheral devices.

Recently, a high-speed communication technology using an ultra wide band (UWB), i.e., several GHz, is introduced. Such an UWB communication technology supports faster data transfer rate, i.e., 500 Mpbs to 1 Gbps, than IEEE 802.11 or Bluetooth, and consumes less power, for example 1/100 of cellular phone or wireless LAN. It is possible to adapt the UWB communication technology to a short-range personal network to connect a personal computer (PC), peripheral devices and electric appliances separated each others within a short range, i.e., average of about 10 to 20 m or maximum of about 100 m, through a high-speed wireless interfaces.

Therefore, there is a great demand of a wireless USB host apparatus supporting the UWB to effectively connect the computer and a plurality of peripheral devices, to easily build a personal wireless network, to support high-speed data transfer rate and to guarantee a quality of service (Qos).

SUMMARY OF THE INVENTION

Accordingly, the present invention is directed to a USB host apparatus supporting UWB that substantially obviates one or more problems due to limitations and disadvantages of the related art.

An object of the present invention is to provide a wireless universal serial bus (USB) host apparatus supporting ultra wide band (UWB) for transforming data stored in a notebook PC to an ultra wide band (UWB) signal, building a network to connect a plurality of wireless USB devices and controlling the network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a wireless USB (universal serial bus) host apparatus supporting an UWB (ultra wide band) for connecting a PC (personal computer) and a plurality of wireless USB device through a wireless link includes a connecting unit for receiving data and a control signal transmitted from the PC. The connecting unit transmits the data and the control signal to a protocol transforming unit and a controlling unit respectively. The connecting unit receives data from a protocol transforming unit and a control signal from a controlling unit and transfer the received data and the control signal to the PC. The wireless USB host apparatus also includes a protocol transforming unit for transforming the data inputted from the connecting unit to a media accessing data and allocating a media accessing slot to each of the wireless USB devices to share a single wireless channel by the plurality of the wireless USB devices. The protocol transforming unit also extracts data from the media accessing data inputted from an UWB physical layer processing unit and transfers the extracted data to the connecting unit. A UWB physical layer processing unit transforms the media accessing data outputted from the protocol transforming unit to an UWB wireless signal and transfers the UWB wireless signal to wireless USB devices. The UWB physical layer processing unit also receives an UWB wireless signal from the wireless USB devices, transforms the received UWB wireless signal to media accessing data, and outputs the media accessing data to the protocol transforming unit. Finally, the wireless USB host apparatus includes a controlling unit for controlling and managing the connecting unit, the protocol transforming unit and the UWB physical layer processing unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
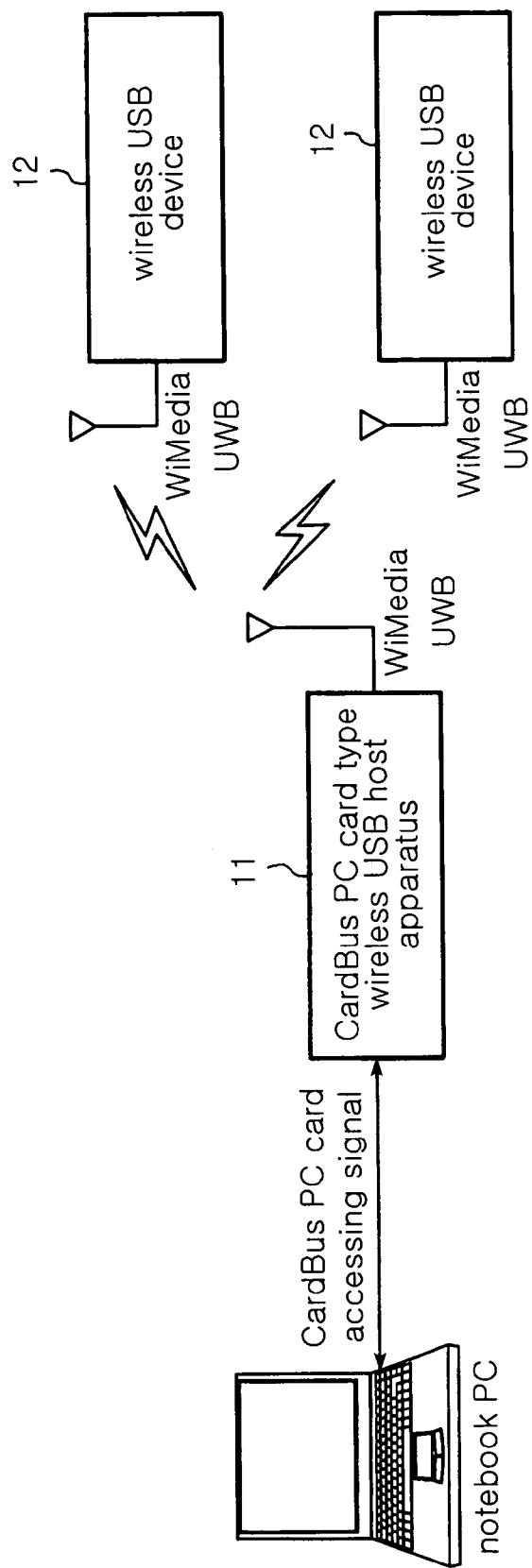
FIG. 1 is a block diagram of a network built with a notebook PC, a wireless USB device and a wireless USB host apparatus according to an embodiment of the present invention.

FIG. 1 is a block diagram of a network built with a notebook PC, a wireless USB device and a wireless USB host apparatus according to an embodiment of the present invention.

Referring to FIG. 1, the wireless universal serial bus (USB) host apparatus 11 has a shape of a CardBus PC card in order to conveniently mounted and demounted to/from a notebook personal computer (PC). After mounting the wireless USB host apparatus 11 to the notebook PC, the wireless USB host apparatus 11 connects a plurality of wireless USB devices 12 through a wireless link, transforms data stored in the notebook PC to an ultra wide band (UWB) signal and transmits the UWB signal to the wireless USB device 12. The wireless USB host apparatus 11 also receives an UWB signal transmitted from the wireless USB device 12, demodulates the UWB signal to data of original format and transfers the data to the notebook PC. The wireless USB host apparatus 11 adapts the typical connection scheme of the CardBus PC card to transmit/receive data to/from the notebook PC at a high data transfer rate.

In more detail, the wireless USB host apparatus 11 receives a CardBus PC card accessing signal from the notebook PC, transforms the received signal to a WiMedia UWB signal that supports a wireless USB host protocol, guaranteeing the QoS (quality of service), supports a data transfer rate of about 53.3 to 480 Mbps in UWB of about 3.1 to 10.6 GHz and transmits the WiMedia UWB signal to the wireless USB device 12. A WiMedia UWB signal is an ISO- published radio platform standard for high-speed ultra wideband (UWB) wireless connectivity. The wireless USB host apparatus 11 also receives a WiMedia UWB signal transmitted from the wireless USB device 12, transforms the WiMedia UWB signal to the CardBus PC card accessing signal of the notebook PC. Also, the wireless USB host apparatus 11 logically connects a plurality of wireless USB devices 12 by using a hub-and-spoke topology. For example, the wireless USB host apparatus 11 maximally connects 127 wireless USB devices. Furthermore, the wireless USB host apparatus 11 allocates time slots and bandwidths to each of connected wireless USB devices 12 through a scheduler function, and performs functions for connection management, power management and security management based on a predetermined QoS policy and Micro Scheduled Channel Time Allocation (MS-CTA) resource for data transmission.

Figure 6:
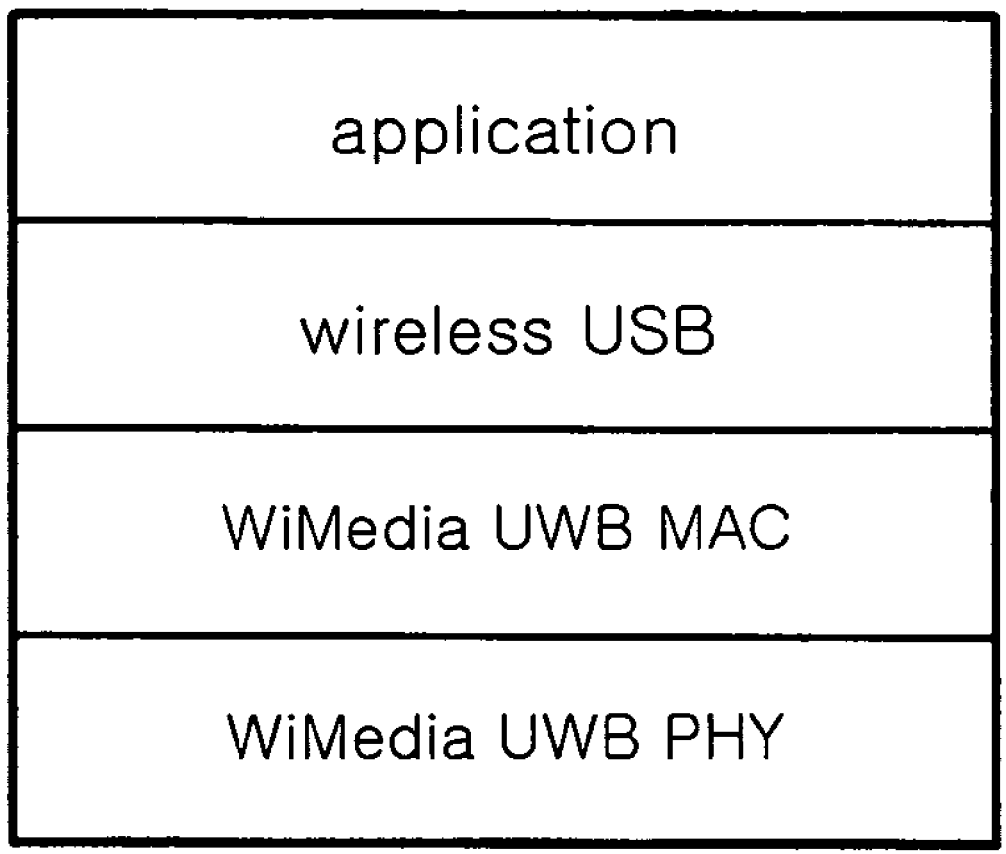
FIG. 6 shows a protocol stack of a wireless USB host apparatus according to an embodiment of the present invention.

The wireless USB host apparatus transforms data of an application level to a WiMedia UWB signal in software manner based on a protocol stack configured of a wireless USB protocol layer, a WiMedia UWB MAC protocol layer and a WiMedia UWB PHY protocol layer as shown in FIG. 6.

The wireless USB device 12 is a peripheral device connected to the notebook PC such as a camera, a mouse, a printer and a keyboard. The wireless USB device 12 connects to the wireless USB host apparatus 11 through a wireless WiMedia UWB signal and transmits/receives wireless USB data through an ultra wide band (UWB). The wireless USB devices 12 also perform various functions for control signal transmission, bulk transmission, isochronous transmission and interrupt transmission.

Figure 2:
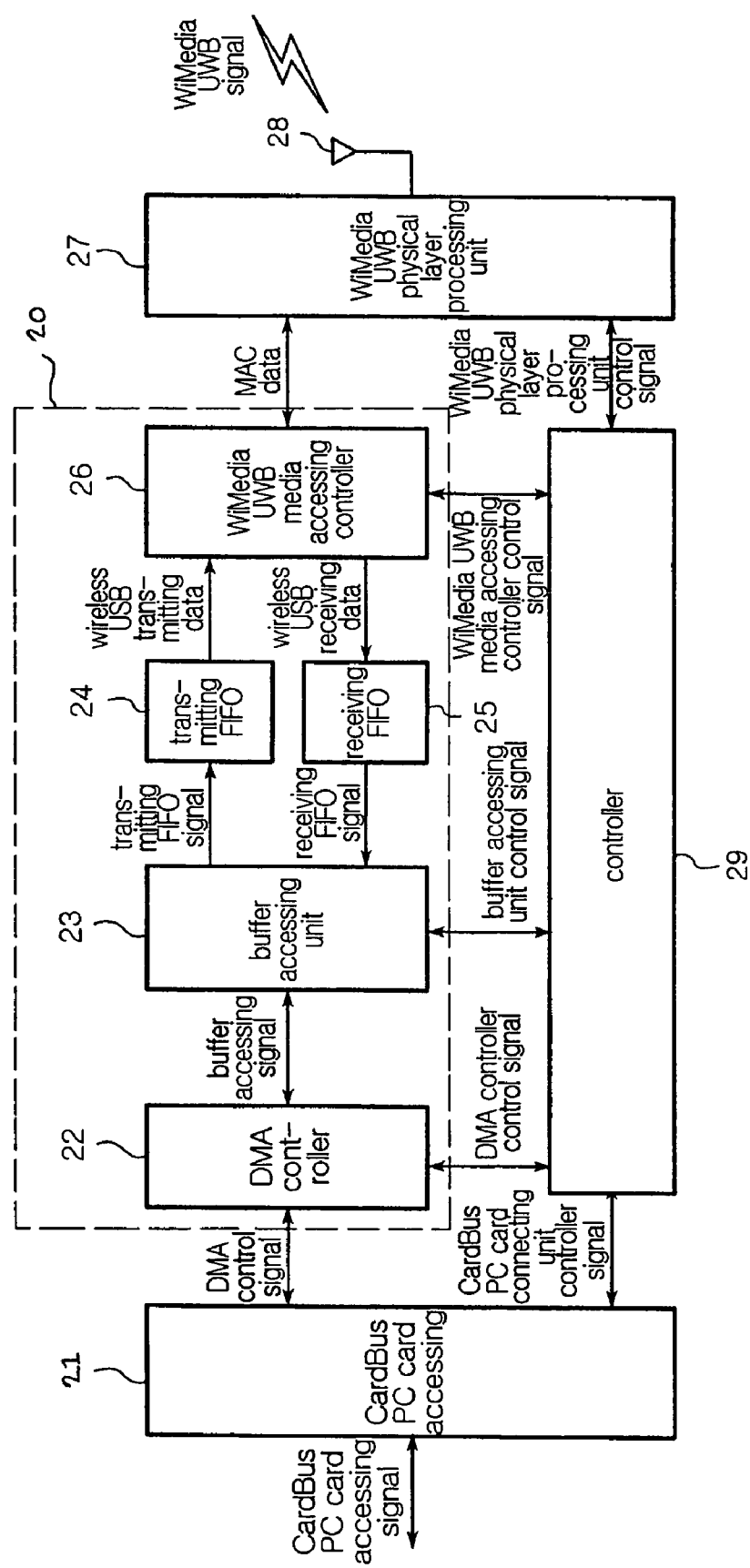
FIG. 2 is a block diagram of a wireless USB host apparatus according to an embodiment of the present invention.

FIG. 2 is a block diagram of a wireless USB host apparatus according to an embodiment of the present invention.

Referring to FIG. 2, the wireless USB host apparatus 11 includes a protocol transforming unit 20, a CardBus PC card connecting unit 21, a WiMedia UWB physical layer processing unit 27 and a controller 29.

The protocol transforming unit 20 receives data of a CardBus PC card interface from the CardBus/PC card connecting unit 21 and transforms the received data to a WiMedia UWB physical layer data. Also, the protocol transforming unit 20 receives the WiMedia UWB physical layer data to data of the CardBus/PC card interface. The protocol transforming unit 20 includes a DMA controller 22, a buffer accessing unit 23, a transmitting FIFO 24 and a receiving FIFO 25 and a WiMedia UWB media accessing controller 26.

The CardBus PC card connecting unit 21 is connected to a CradBus PC card interface of the notebook PC and transmits CardBus PC card accessing signal. Herein, the CardBus PC card accessing signal is a multiplexed signal to include a CardBus PC card address, data, CardBus Pc card control signal and CardBus PC card state signal. The CardBus PC card connecting unit 21 transforms the CardBus PC card address and data to a direct memory access (DMA) control signal and transfers the DMA control signal to the DMA controller 22 of the protocol transforming unit 20. Also, the CardBus PC card connecting unit 21 converts the CardBus PC card control signal and the CardBus PC card state signal to a CardBus PC card connecting unit control signal and transfers the CardBus PC card connecting unit control signal to the controller 29.

The DMA controller 22 receives a DMA control signal from the CardBus. PC connecting unit 21 and transfers not only non real-time data stored in a host memory of the notebook PC but also real-time audio/video data to the buffer accessing unit 23. The DMA controller 22 also receives a buffer access signal from the buffer accessing unit 23 and transfers not only non real-time data stored in the receiving FIFO 25 but also real-time audio/video data to the CardBus PC card connecting unit 21.

The buffer accessing unit 23 transforms the buffer accessing signal of the DMA controller 22 to the transmitting FIFO signal and transfers not only non real-time data read from the DMA controller 22 but also the real-time audio/video data to the transmitting FIFO 24. The buffer accessing unit 23 also converts the receiving FIFO signal of the receiving FIFO 25 to a buffer accessing signal and transfers the buffer accessing signal to the DMA controller 22.

The transmitting FIFO 24 receives the transmitting FIFO signal of the buffer accessing unit 23, temporally stores non real-time data of the notebook PC and real-time audio/video data and transfers them to the UWB media accessing controller 26.

The receiving FIFO 25 receives the wireless USB receiving data from the UWB media accessing controller 26, temporally stores the wireless USB receiving data, converts the wireless USB receiving data to a receiving FIFO signal and transfer the receiving FIFO signal to the buffer accessing unit 23.

The UWB media accessing controller 26 receives the wireless USB transmitting data from the transmitting FIFO 24, receives a control signal from the controller 29, converts it to MAC data of WiMedia UWB MAC protocol data unit (MAC MPDU) format and transfers the MAC data to the WiMedia UWB physical layer processing unit 27. The UWB media accessing controller 26 receives the MAC data from the WiMedia UWB physical layer processing unit 27 and transmits command data, control data, non real-time data and real-time audio/video data supporting the QoS by allocating a media access slot to each of the wireless USB devices 12 using a time division multiple access (TDMA) based distributed reservation protocol (DRP) in order to share a single transmission channel by a plurality of wireless USB devices 12 at the same time.

Figure 7:
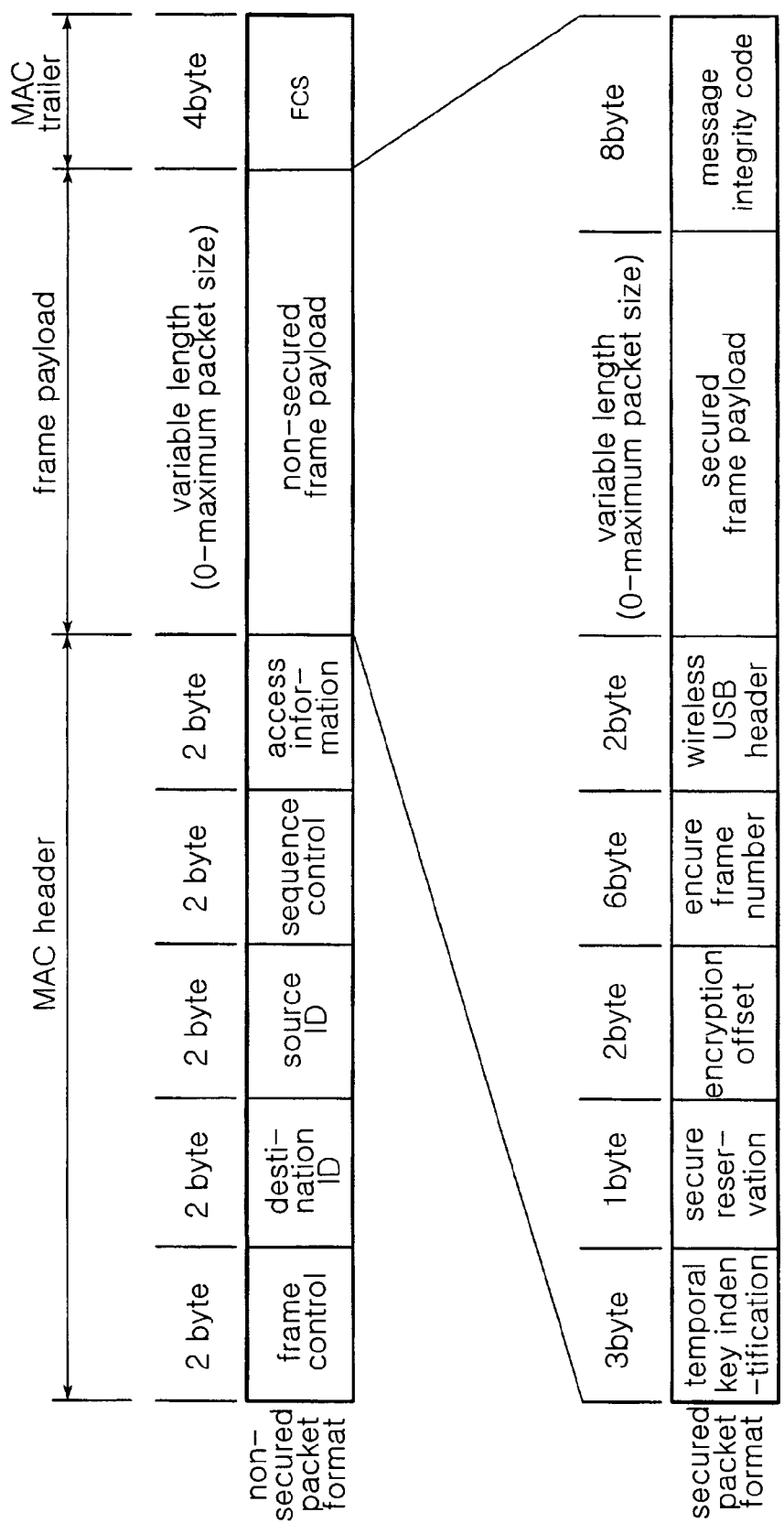
FIG. 7 is a diagram of a WiMedia UWB MAC MPDU frame used in the present invention.

The structure of the Wimedia UWB MAC MPDU data is shown in FIG. 7. The WiMedia UWB MAC MPDU data includes a MAC header, a MAC frame payload and a MAC trailer. The UWB media accessing controller 26 creates the MAC frame payload using the transmitting USB wireless data from the transmitting FIFO 24, creates the MAC header using the control signal from the controller 29, and creates the MAC data by combining the MAC header and the MAC frame payload. On the contrary, the UWB media accessing controller 26 divides the MAC data inputted from the UWB physical layer processing unit 27 into the MAC frame payload and the MAC header, transfers the MAC frame payload to the receiving FIFO 25 as the wireless USB receiving data, and transfers the MAC header to the controller 29. Furthermore, the WiMedia UWB MAC MPDU data may be created as a secured packet format or non-secured packet format. In case of the secured packet format, the MAC frame payload includes encoding information and encoded frame payload. A user may select one between the non-secured packet format and the secured packet format.

Figure 5:
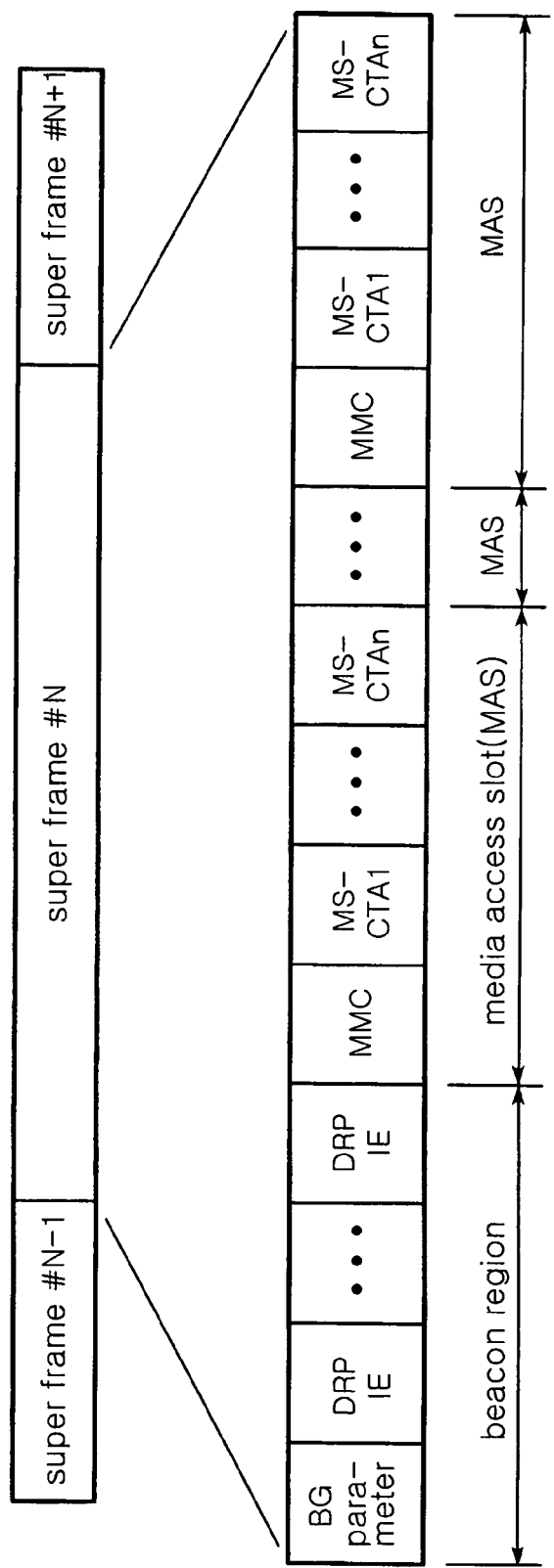
FIG. 5 is a diagram of a wireless USB super frame used in the present invention.

The super frame of the wireless USB transmitting/receiving data which is loaded in the MAC frame payload of the MAC data includes a beacon region and a media access slot as shown in FIG. 5. Herein, the UWB MAC unit 26 then allocates a media access slot to a plurality of wireless USB devices 12 based on TDMA based DRP and transmits real-time audio/video data supporting the QoS as well as command data, control data and non real-time data.

The UWB physical layer processing unit 27 receives MAC data shown in FIG. 7 from the UWB media access controlling unit 26 and a WiMedia UWB PHY control signal from the controller 29, transforms the MAC data and the WiMedia UWB PHY control signal to a WiMedia UWB signal that supports a data transfer rate of about 53.3 to 480 Mbps in a ultra wide band of about 3.1 to 10.6 GHz and transfers the WiMedia UWB signal to an antenna 28. On the contrary, the UWB physical layer processing unit 27 receives a WiMedia UWB signal of the wireless USB device 12 from the antenna 28, converts the WiMedia UWB signal to the MAC data of the format shown in FIG. 7 and transfers the MAC data to the UWB media access controlling unit 26.

The antenna 28 is embodied to transmit/receive a WiMedia UWB signal through the UWB of about 3.1 to 10.6 GHz.

The controller 29 controls and manages the CardBus PC card connecting unit 21 the DMA controller 22, the buffer accessing unit 23, the WiMedia UWB media accessing controller 26 and the WiMedia UWB physical layer processing unit 27.

Figure 3:
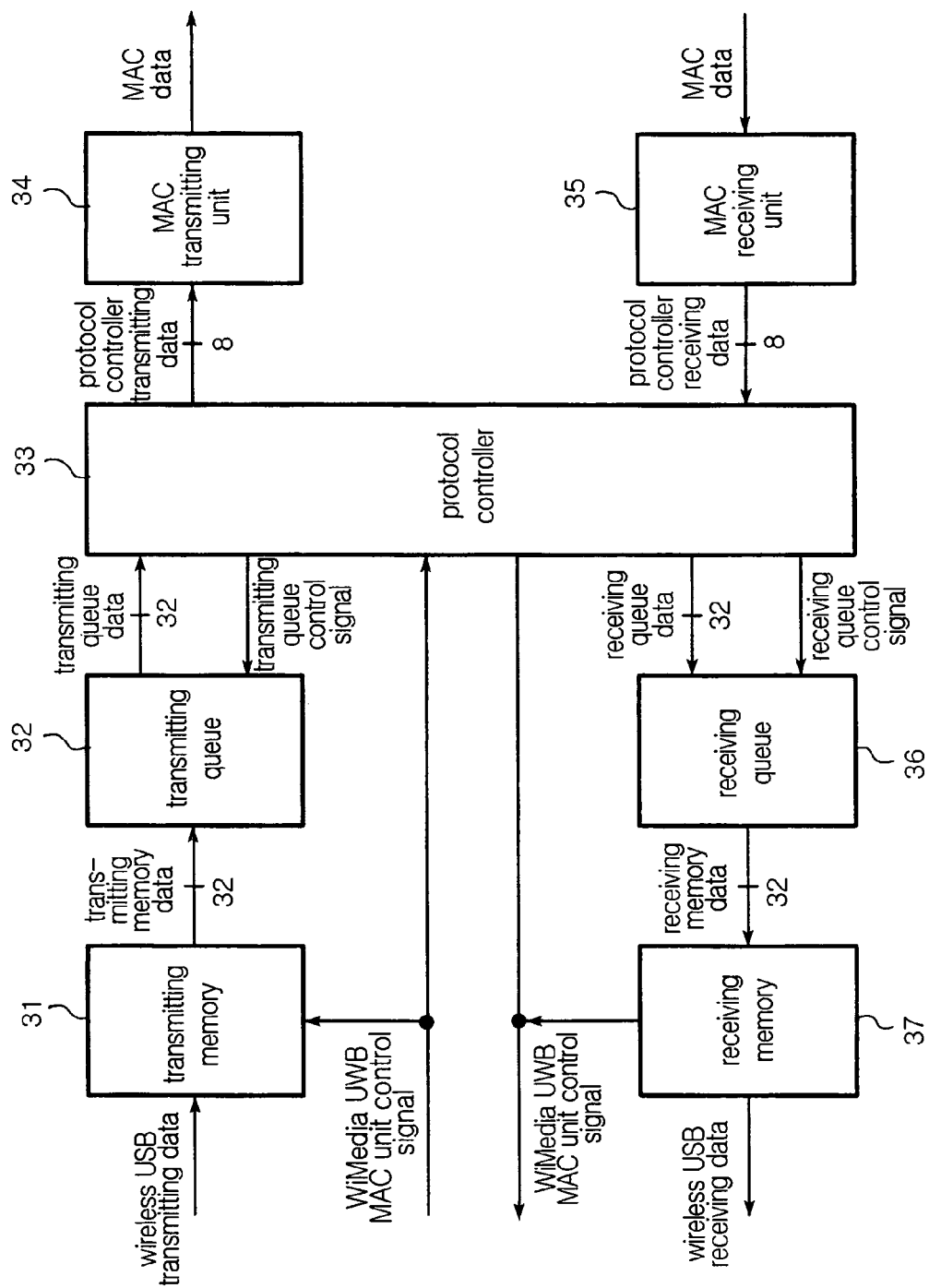
FIG. 3 is a block diagram illustrating the WiMedia UWB media accessing controller 26 in the wireless USB host apparatus shown in FIG. 2.

FIG. 3 is a block diagram illustrating the WiMedia UWB media accessing controller 26 in the wireless USB host apparatus shown in FIG. 2.

As shown in FIG. 3, the WiMedia UWB media accessing controller 26 includes a transmitting memory 31, a transmitting queue 32, a protocol controller 33, a MAC transmitting unit 34, a MAC receiving unit 35, a receiving queue 36 and a receiving memory 37.

Operations of the WiMedia UWB media accessing controller 26 will be described in detail with reference to FIG. 3.

The transmitting memory 31 receives a wireless USB transmitting data, which is the MAC frame payload shown in FIG. 7, from the transmitting FIFO 24, receives a WiMedia UWB MAC control signal from the controller 29, temporally stores them, combines the MAC frame payload and the MAC header to be one between the non secured format and the secured format according to the user's selection, transforms the combined data to transmitting memory data of 32 bit unit, and transfers the transmitting memory data to the transmitting queue 32.

The transmitting queue 32 receives the transmitting memory data of 32 bit unit from the transmitting memory 31, temporally stores the transmitting memory data, and transfers the transmitting queue data of 32 bit unit to the protocol controller 33 according to the transmitting queue control signal of the protocol controller 33.

The MAC transmitting unit 34 receives transmitting data of 8 bit unit outputted from the protocol controller 33, generates a MAC trailer of 4 bytes frame check sequence (FCS), creates the MAC data of WiMedia UWB MAC PDU frame by combining the transmitting data and the MAC trailer and transfers the MAC data to the UWB physical layer processing unit 27.

The MAC receiving unit 35 receives the MAC data of the WiMedia UWB MAC MPDU frame format from the UWB physical layer processor 27, performs operations for identifying a frame address, detecting overlapped frames and FCS inspection, converts the MAC data to the receiving data of 8 bit unit by eliminating the MAC trailer from the MAC data, and transfers the receiving data to the protocol controller 33.

The receiving queue 36 temporally stores the receiving queue data of 32 bit unit outputted from the protocol controller 33, converts the stored receiving queue data to the receiving memory data of 32 bit unit according to the receiving queue control signal of the protocol controller 33, and transfers the receiving memory data to the receiving memory 37.

The receiving memory 37 temporally stores the receiving memory data of 32 bit unit transferred from the receiving queue 36, divides the stored receiving memory data to a MAC frame payload and a MAC header, transforms the MAC frame payload to a wireless USB receiving data, transfers the wireless USB receiving data to the receiving FIFO 25, and transfers the MAC header to the controller 29 as a control signal of the WiMedia UWB media accessing controller.

The protocol controller 33 receives a transmitting queue data of 32 bit unit, which is non real-time data or real-time audio/video data that supports the QoS, transforms the transmitting queue data to a protocol control transmitting data of 8 bit unit and transfers the protocol controller transmitting data to the MAC transmitting unit 34. Also, the protocol controller 33 receives command data and control data, which are a WiMedia UWB MAC control signal, from the controller 29, transforms them to a protocol controller transmitting data of 8 bit unit and transfers the protocol controller transmitting data to the MAC transmitting unit 34. Furthermore, the protocol controller 33 distributes a Media Access Slot (MAS) in a wireless USB super frame of FIG. 5 to a plurality of wireless USB devices 12 based on TDMA based DRP in order to share a single wireless channel by the plurality of wireless USB devices 12. Accordingly, command data, control data, non real-time data and real-time audio/video data supporting QoS can be transmitted at the same time.

The protocol controller 33 receives a protocol controller receiving data of 8 bit unit from the MAC receiving unit 35, transforms the protocol controller receiving data to the receiving queue data of 32 bit unit, transfers the receiving queue data to the receiving queue 36 with the receiving queue control signal, transforms the command data and the control data to a control signal of the WiMedia UWB media access controller, and transfers the control signal to the controller 29.

Figure 4:
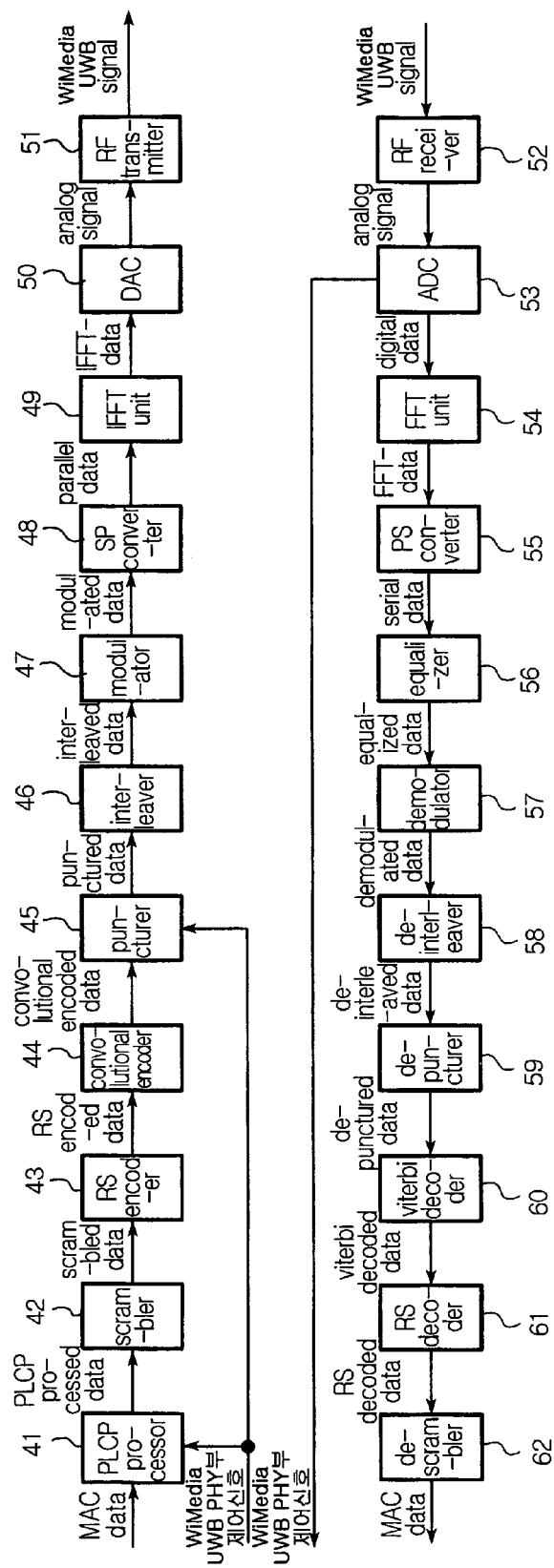
FIG. 4 is a block diagram illustrating the UWB physical layer processing unit 27 according to the present invention.

FIG. 4 is a block diagram illustrating the UWB physical layer processing unit 27 according to the present invention.

Operations of the UWB physical layer processing unit 27 will be described in detail with reference to the FIG. 4.

Figure 8:
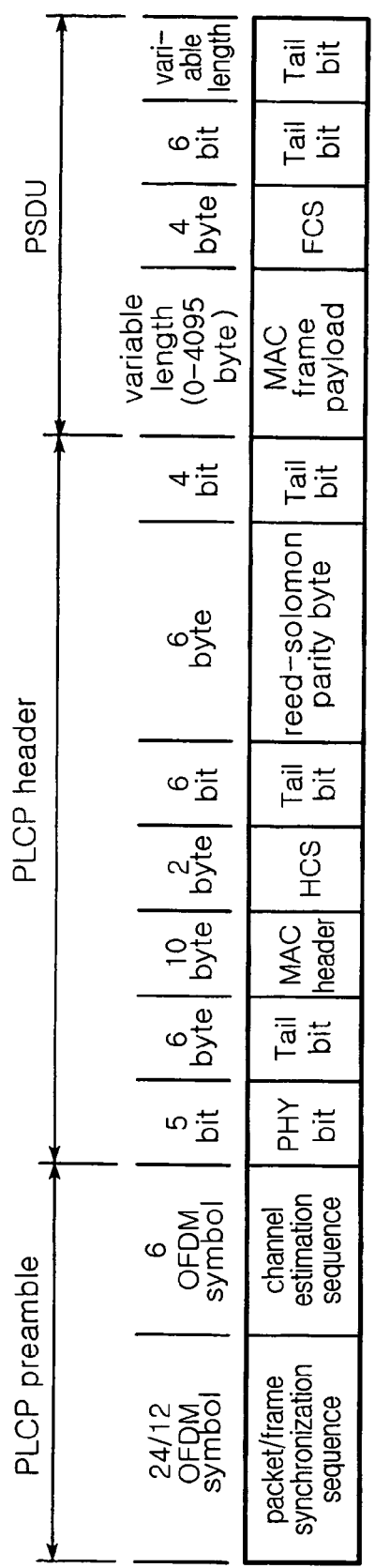
FIG. 8 is a diagram of a WiMedia UWB PHY PPDU frame used in the present invention.

A physical layer convergence procedure (PLCP) processor 41 receives MAC data from the UWB media accessing controller 26, receives the control signal of the WiMedia UWB physical layer processing unit from the controller 29, transforms them to PLCP processor data of WiMedia UWB PHY protocol data unit (PHY PRDY) frame format shown in FIG. 8, and transfers the PLCP processor data to a scrambler 42.

The scrambler 42 transforms the PLCP processor data to a code of a predetermined format. The data outputted from the scrambler 42 is encoded by a Reed Solomon (RS) encoder 43 to correct burst errors which is generated by instant noise, and the RS-encoded data is encoded by a convolutional encoder 44 to correct random errors. A puncturer 45 receives the output of the convolutional encoder 44 and performs a puncturing process to regularly omit a predetermined portion of the received data in order to increase a code rate and be suitable to a data transfer rate assigned by the controller 29. An interleaver 46 receives the punctured data from the puncturer 45 and performs a bit-interleaving process to rearrange symbol sequence and data sequence in a predetermined unit for correcting burst errors which may caused by the instant noise. A modulator 47 receives the output of the interleaver 46 and modulates the received data based on a predetermined modulation scheme. For example, a quadrature phase shift keying (QPSK) scheme may be used for a data transfer rate of about 53.3 to 200 Mbps, and a dual carrier modulation (DCM) scheme may be used for a data transfer rate of about 320 to 480 Mbps. The modulated data outputted from the modulator 47 is a serial data. The serial-to-parallel converter 48 receives the serial data from the modulator 47 and converts the serial data to parallel data. An inverse fast fourier transform (IFFT) unit 49 transforms the parallel data based on IFFT scheme. A digital-to-analog converter 50 converts the transformed data from the IFFT unit 49 to analog signal. A radio frequency transmitter 51 transforms the analog signal from the digital-to-analog converter 50 to a WiMedia UWB signal that supports a transfer data rate of about 53.3 to 480 Mbps in about 3.1 to 10.6 GHz. The WiMedia UWB signal is transferred to the antenna 28 to transmit.

As described above, the wireless USB transmitting data is transformed to the ultra wide band (UWB) signal through the encoding processes for minimizing noises.

A RF receiver 52 of the UWB physical layer processing unit 27 receives a WiMedia UWB signal of the wireless USB device 12 through the antenna 28 and demodulates the received WiMedia UWB signal to an analog signal of a baseband. An analog-to-digital converter (ADC) 53 receives the analog signal and converts the analog signal to a digital data. The digital data is transferred to a fast fourier transform (FFT) unit 54. While converting the analog signal to the digital data, a receive signal strength indicator (RSSI) data is detected from the WiMedia UWB receiving signal and the RSSI data is transferred to the controller 29 as a control signal of the UWB physical layer processing unit. The FFT unit 54 transforms the digital data to FFT data based on the FFT scheme, and a parallel-to-serial converter 55 converts the FFT data to serial data. The serial data is equalized at an equalizer 56 for correcting signal errors caused by a transmission channel, and a demodulator 57 demodulates the equalized data to original data based on a predetermined demodulation scheme. For example, a QPSK scheme is used for a data transfer rate of about 53.3 to 200 Mbps, and a DCM scheme is used for a data transfer rate of about 320 to 480 Mbps. A de-interleaver 58 performs a bit interleaving operation on the demodulated data to correct a burst error, and a de-puncturer 59 recovers the omitted portion of the demodulated data. Then, a viterbi decoder 60 performs a viterbi decoding on the recovered data to correct random errors. The viterbi-decoded data is decoded based on a Reed Solomon decoding scheme in a RS decoder 61 for correcting the burst error. Finally, a descrambler 62 transforms the RS-decoded data to the MAC data of the WiMedia UWB MAC MPDU frame format through descrambling the scrambled code of random format, which is the RS-decoded data from the RS decoder 61. The MAC data is transferred to the UWB media accessing controller 26.

As described above, the wireless USB host apparatus 11 according to the present invention allocates the MAS of USB super frame to each of the plurality of wireless USB devices 12. Therefore, the wireless USB host apparatus 11 according to the present invention can transmit the real-time audio/video data as well as command data, control data and non real-time data through a single transmission channel. Also, the wireless USB host apparatus 11 uses the ultra wide band to exchange data with the plurality of wireless USB devices 12. Therefore, the wireless USB host apparatus 11 according to the present invention supports the data transfer rate of about 53.3 to 480 Mbps, guarantees the QoS and supports transmission of the real-time audio/video data.

According to the present invention, the wireless USB host apparatus 11 is mounted at a general notebook PC and provides the wireless USB host protocol function to the notebook PC. Also, the wireless USB host apparatus 11 transforms the data stored in the notebook PC to the WiMedia UWB signal guaranteeing the QoS and transmits the WiMedia UWB signal through the ultra wide band of about 3.1 to 10.6 GHz in a data transfer rate of about 54.4 to 480 Mbps. The wireless USB host apparatus 11 also provides functions for reverse-transforming the WiMedia UWB signal to the data of the notebook PC. Therefore, a high-speed wireless WiMedia UWB network can be built using the wireless USB host apparatus 11 according to the present invention.

Furthermore, the wireless USB host apparatus 11 can transmit the real-time audio/video data as well as the non real-time data the wireless USB devices separately located in home, office or rooms through the high-speed WiMedia UWB network built with the notebook PC and the plurality of wireless USB devices. Moreover, the wireless USB host apparatus 11 according to the present invention is easy to install compared to the conventional USB host apparatus, has simple structure and requires low manufacturing cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A wireless USB (universal serial bus) host apparatus supporting an UWB (ultra wide band) for connecting a PC (personal computer) and a plurality of wireless USB devices through a wireless link, the wireless USB host apparatus comprising:

a connecting unit for receiving transmit data and a control signal from the PC and transmitting the transmit data and the control signal to a protocol transforming unit and a controlling unit, respectively, and wherein the connecting unit receives received data from the protocol transforming unit and a control signal from the controlling unit and transfers the received data and the control signal to the PC;

the protocol transforming unit for transforming the transmit data inputted from the connecting unit to a media accessing data and allocating a media accessing slot to each of the wireless USB devices to share a single wireless channel by the plurality of the wireless USB devices, and wherein the protocol transforming unit extracts the received data from the media accessing data received from an UWB physical layer processing unit and transferring the extracted data to the connecting unit;

the UWB physical layer processing unit for transforming the media accessing data outputted from the protocol transforming unit to an UWB wireless signal and transferring the UWB wireless signal to the wireless USB devices, and receiving an UWB wireless signal from the wireless USB devices, transforming the received UWB wireless signal to media accessing data and outputting the media accessing data to the protocol transforming unit; and the controlling unit for controlling and managing the connecting unit, the protocol transforming unit and the UWB physical layer processing unit, wherein the PC connected to the plurality of wireless USB devices, that transmit and receive wireless data through UWB and shares the single transmission channel, supports a Quality of Service (QoS) for each of the plurality of wireless USB devices at the same time.

2. The wireless USB host apparatus of claim 1, wherein the connecting unit is connected to the PC through a CardBus/PC card interface.

3. The wireless USB host apparatus of claim 2, wherein the connecting unit receives a multiplexed accessing signal including a PC card address, transmit data, a CardBus/PC card control signal, and a CardBus/PC card state signal from the PC, transforms the PC card address and the transmit data in the multiplexed accessing signal to a direct memory access control signal and transferring the transformed data to the protocol transforming unit, and transferring the CardBus/PC card control signal and the CardBus/PC card state signal to the controlling unit.

4. The wireless USB host apparatus of claim 3, wherein the protocol transforming unit includes:

a DMA (direct memory access) controller for receiving the direct memory access signal from the connecting unit, transforming the direct memory access signal to a buffer accessing signal and transferring the buffer accessing signal to a buffer accessing unit, and transfers data stored in a receiving FIFO (first in first out) to the connecting unit according to the buffer accessing signal from the buffer accessing unit;

the buffer accessing unit for transforming the buffer accessing signal received from the DMA controller to a transmit FIFO signal and transferring the transmit FIFO signal to a transmitting FIFO, and wherein the buffer accessing unit transforms a receiving FIFO signal received from the receiving FIFO to the buffer accessing signal and transferring the buffer accessing signal to the DMA controller;

the transmitting FIFO for receiving the transmit FIFO signal from the buffer accessing unit, temporally storing data stored in a host memory of the PC and transferring the temporally stored data to an UWB media accessing controller as wireless USB transmitting data;

the receiving FIFO for temporally storing wireless USB receiving data, transforming the wireless USB receiving data to the receiving FIFO signal and transferring the receiving FIFO signal to the buffer accessing unit; and the UWB media accessing controller for allocating the media accessing slot to the plurality of wireless USB devices, creating a payload of a MAC data with the data stored in the transmitting FIFO and a header of the MAC data with the control signal inputted from the controlling unit according to the allocated media accessing slot, transferring the MAC data having the payload and the header to the UWB physical layer processing unit, and receiving the MAC data from the UWB physical layer processing unit, reverse-transforming the received MAC data to the wireless USB receiving data and transferring the wireless USB receiving data to the receiving FIFO.

5. The wireless USB host apparatus of claim 4, wherein the UWB media accessing controller allocates the media access slot of a super frame to each of the plurality of wireless USB devices based on a TDMA (time division multiple access) based DRP (distributed reservation protocol) scheme.

6. The wireless USB host apparatus of claim 4, wherein the UWB media accessing controller includes:

a transmitting memory for receiving the wireless USB transmitting data from the transmitting FIFO and MAC header information from The controlling unit, creating the MAC data through combining the USB transmitting data and the MAC header information, storing the MAC data, transforming the MAC data to the transmitting memory data and outputting the transmitting memory data to a transmitting queue;

a transmitting queue for temporally storing the transmitting memory data inputted from the transmitting memory, transforming the transmitting memory data to the transmitting queue data according to a transmitting control signal of a protocol controller and transferring the transmitting queue data to the protocol controller;

the protocol controller for allocating the media accessing slot to the plurality of wireless USB devices, transforming the transmitting queue data from the transmitting queue and the control data from the controlling unit to the protocol controller transmitting data of 8 bit unit and transferring the protocol controller transmitting data to a MAC transmitter, receiving the protocol controller receiving data of 8 bit unit from a MAC receiver, transforming the wireless USB receiving data to a receiving queue data and transferring the receiving queue data to the receiving queue with a receiving queue control signal, and transferring command and control data to the controlling unit;

the MAC transmitter for receiving the protocol controller transmitting data from the protocol controller, transforming the protocol controller transmitting data to the MAC data having a MAC trailer of FCS (Frame check sequence), and transferring the transformed MAC data to the UWB physical layer processing unit;

the MAC receiver for receiving the MAC data from the UWB physical layer processing unit, identifying a frame address, detecting overlapped frames, performing a FCS inspection, eliminating the MAC trailer, transforming to the protocol controller receiving data of 8 bit unit, and outputting the protocol controller receiving data to the protocol controller;

the receiving queue for receiving the receiving queue data from the protocol controller, temporally storing the receiving queue data, transforming the temporally stored data to a receiving memory data, and transferring the receiving memory data to a receiving memory; and the receiving memory for receiving the receiving memory data from the receiving queue, temporally storing the receiving memory data, dividing the receiving memory data to a payload and a header of a MAC frame, transforming the payload to the wireless USB receiving data and outputting the wireless USB receiving data to the receiving FIFO, and transferring the header information to the controlling unit.

7. The wireless USB host apparatus of claim 4, wherein the UWB physical layer processing unit includes:

a PLCP (physical layer convergence procedure) processor for transforming the MAC data inputted from the UWB media accessing controller to a PLCP processor data of an UWB physical layer structure;

a transmit data processor for processing the data outputted from the PLCP processor to correct errors generated during transmission;

a modulator for modulating the data outputted from the transmit data processor based on a predetermined modulation scheme supporting a predetermined data transfer rate;

a serial-to-parallel converter for converting the data outputted from the modulator to a parallel data;

an IFFT (inverse fast fourier transform) unit for performing an IFFT on the parallel data outputted from the serial-to-parallel converter;

a DAC (digital-to-analog converter) for converting the data outputted from the IFFT unit to an analog signal;

a RF (radio frequency) transmitter for transforming the analog signal from the DAC to a wireless signal of an ultra wide band and transferring the wireless signal to an antenna;

a RF (radio frequency) receiver for receiving a wireless signal of an ultra wide band received through the antenna and transforming the wireless signal to an analog signal;

an ADC (analog-to-digital converter) for converting the analog signal outputted from the RF receiver to digital data, and providing a RSSI (receive signal strength indicator) of the analog signal to the controlling unit;

a FFT (fast fourier transform) unit for performing a FFT on the digital data outputted from the ADC;

a parallel-to-serial converter for converting the data outputted from the FFT unit to serial data;

an equalizer for equalizing the serial data outputted from the parallel-to-serial converter to correct error caused by a transmission channel;

a demodulator for demodulating the data outputted from the equalizer, and a receiving data processor for processing the data outputted from the demodulator to correct errors in the data, transforming the error-corrected data to the MAC data and outputting the MAC data to the UWB media accessing controller.

8. The wireless USB host apparatus of claim 7, wherein the transmit data processor includes:

a scrambler for transforming the PLCP processor data outputted from the PLCP processor to a code of a random format;

a RS (Reed Solomon) encoder for encoding the data outputted from the scrambler based on a RS encoding scheme to correct a burst error generated by instant noise;

a convolutional encoder for encoding the data outputted from the RS encoder on a convolutional encoding scheme to correct a random error;

a puncturer for receiving the data outputted from the convolutional encoder and a data-transfer-rate data from the controlling unit, and performing a puncturing operation on the received data from the convolutional encoder to regularly omit a predetermined portion of the data according to a predetermined data transfer rate in order to increase a code rate; and an interleaver for rearranging a symbol sequence and a data sequence of the data outputted from the puncturer to correct a burst error generated by instant noise.

9. The wireless USB host apparatus of claim 7, wherein the receiving data processor includes:

a de-interleaver for correcting a burst error in the data outputted from the modulator;

a de-puncturer for receiving the data outputted from the de-interleaver and recovering an omitted portion of the received data by the puncturing operation;

a viterbi decoder for decoding the data outputted from the de-puncturer to correct a random error included in the data outputted from the de-puncturer;

a RS decoder for performing a RS decoding on the data outputted from the viterbi decoder to correct a burst error in the data outputted from the viterbi decoder; and a de-scrambler for transforming the data outputted from the RS decoder, which is scrambled to a code of a random format, to the MAC data, and transferring the MAC data to the UWB media accessing controller.

10. The wireless USB host apparatus of claim 7, wherein the modulator and the demodulator perform modulation/demodulation operation based on a QPSK (quadrature phase shift keying) scheme for a data transfer rate of about 53.3 to 200 Mbps or based on a DCM (dual carrier modulation) scheme of a data transfer rate of about 320 to 480 Mbps.

11. The wireless USB host apparatus of claim 1, wherein the PC connected to the plurality of wireless USB devices that transmit and receive wireless data through UWB share a single transmission channel at the same time.

* * * * *